United States Patent [19]
Lecourt et al.

[11] 4,289,168
[45] Sep. 15, 1981

[54] METHOD FOR MAKING PIPE OF FABRIC IMPREGNATED WITH RESIN

[75] Inventors: Guy B. E. Lecourt, Massy, France; Claude L. L. Portalier, Marly Le Roi, both of France

[73] Assignee: Societe Nationale Industrielle et Aerospatiale, Paris, France

[21] Appl. No.: 75,997

[22] Filed: Sep. 17, 1979

[30] Foreign Application Priority Data

Sep. 22, 1978 [FR] France .................. 78 27205

[51] Int. Cl.³ .................. F16L 9/16; B29D 23/12; B23D 23/13
[52] U.S. Cl. .................. 138/109; 138/129; 156/189; 156/191; 156/194; 156/245; 239/589; 239/DIG. 19; 264/137; 264/258; 264/292; 264/294; 264/320
[58] Field of Search .................. 156/194, 169, 173, 175, 156/184, 191, 221, 245, 189, 229, 295; 264/258, 320, 322, 134, 136, 137, 292, 325, 294, 295, 135, 165; 138/109, 129, 178, 124, 125, 126, 144, 145, DIG. 11; 239/589, 602, DIG. 19

[56] References Cited

U.S. PATENT DOCUMENTS

| | | | |
|---|---|---|---|
| 1,896,135 | 2/1933 | Dunlap | 138/109 |
| 2,001,977 | 5/1935 | Riddell | 156/194 |
| 2,013,747 | 9/1935 | Dunlap | 264/320 |
| 2,400,533 | 5/1946 | Buffington | 264/258 |
| 2,404,904 | 7/1946 | Collins | 138/145 |
| 2,594,693 | 4/1952 | Smith | 138/145 |
| 2,739,089 | 3/1956 | Hageltorn | 138/DIG. 11 |
| 2,967,796 | 1/1961 | Raffell | 156/194 |
| 3,112,895 | 12/1963 | Kinney | 156/189 |
| 3,115,271 | 12/1963 | Anderson et al. | 156/189 |
| 3,115,988 | 12/1963 | Warnken | 156/189 |
| 3,116,319 | 1/1965 | Brilhart | 156/189 |
| 3,188,255 | 6/1965 | McMullin | 156/189 |
| 3,272,672 | 9/1966 | Lampman et al. | 156/189 |
| 3,896,206 | 7/1975 | Beaver et al. | 264/258 |
| 3,965,235 | 6/1976 | White | 264/320 |

*Primary Examiner*—W. E. Hoag
*Attorney, Agent, or Firm*—Burgess, Ryan and Wayne

[57] ABSTRACT

The invention is a method for the manufacture of hollow bodies, particularly pipes, from fabric reinforced resin by forming a coil of fabric impregnated with resin, which is dried, preheated, and introduced into a preheated mold. The coil is pressed axially into the mold between a preheated borer defining the interior shape of the pipe, and a sleeve, and the resin impregnated in the fabric is polymerized. The product is useful in the manufacture of nozzles for missiles or the like.

10 Claims, 5 Drawing Figures

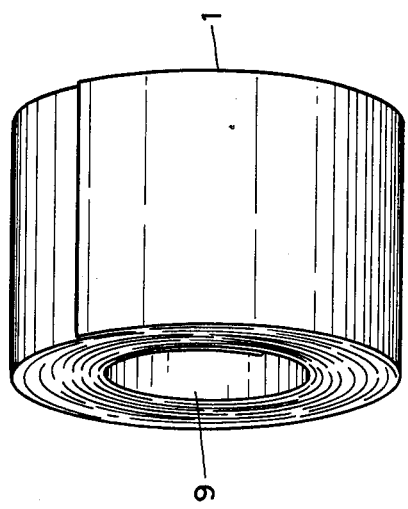
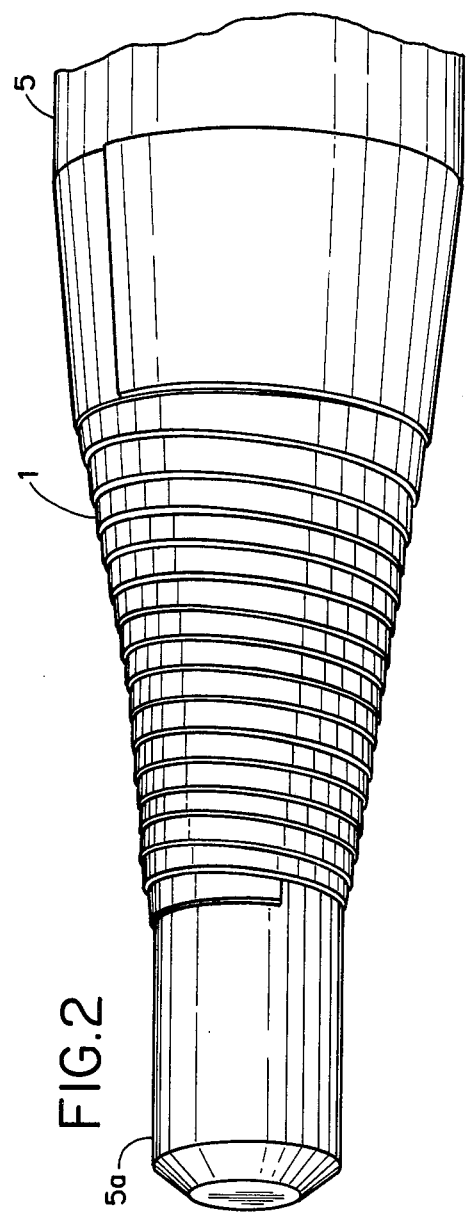

METHOD FOR MAKING PIPE OF FABRIC IMPREGNATED WITH RESIN

The present invention is directed to a method for making hollow structures of elongated form, open at the ends, herein designated as "pipe", made of fabric impregnated with resin.

BACKGROUND OF THE INVENTION

Hollow bodies, tubular elements, tubes or pipes of reinforced plastic can be produced by various methods. Thus, pipes can be produced by centrifual molding, which comprises placing the fabric on the inner wall of a metal tube rotating at high speed, introducing resin into the tube, which penetrates into the fabric, by centrifugal force, and hardening the resin by heating the tube-mold. French Pat. No. 1,347,394 applies this method to the manufacture of a pillar in a conical, slightly inclined mold, while French Pat. No. 2,197,711 uses the same principle to manufacture a conical tube of reinforced synthetic resin.

A second method which is the most widely used consists of winding on a form composed of several disassemblable elements, as proposed in French Pat. No. 1,169,030, or on a mandrel, a filament or ribbon which is passed through a bath of resin for impregnation, as disclosed in French Pat. No. 1,302,187. This method requires constant attention to the impregnation of of the filaments and in general, requires that the filaments be kept under uniform tension, to provide a structure with high mechanical strength.

Another method generally used to manufacture a hollow structure open at both ends, consists of cutting a large number of flongs of fabric, impregnated with resin, corresponding to the form of the desired structure. These fabric flongs are then grouped and stacked in a predetermined order and positioned on a mandrel representative of the interior shape of the structure. The positioned fabric and mandrel are then pressed in a mold formed of two half-shells corresponding to the shape of the structure. The structure can then be polymerized at ambient temperature or in an oven at an elevated temperature and at a temperature dependent upon the nature of the fabric and the resin used. This method of manufacture is time-consuming and expensive. It also results in a substantial waste of fabrics which are high in cost since they are made of threads of silica or threads of carbon or graphite, for example, when used in aeronautical construction.

Particularly in aeronautical structures, the required mechanical strength of the pipes produced by the various methods mentioned above, is not always achieved owing either to poor impregnation of the textile structure before winding or to irregular tension in the course of winding or to the uneven molding pressure in a half-shell mold.

BRIEF SUMMARY OF THE INVENTION

It is an object of the present invention to reduce the hours of labor, to diminish the consumption of impregnated cloth, to lower the manufacturing cost of the product, while at the same time increasing the mechanical strength of the desired product. The objects of the invention are achieved by a method of making pipe of fabric impregnated with resin which comprises winding a fabric impregnated with resin, preferably a thermosetting resin, in a cylindrical coil; the coil is pre-heated, then placed in the openings of a pre-heated shaping mold; axial pressures are applied to the coil at both ends of the mold, the polymerization of the coil is carried out in the mold, and the polymerized piece is removed from the mold. According to the invention, the web of resin-impregnated fabric is dried before being wound on itself into a hollow cylinder or "coil" whose dimensions are in keeping with those of the pipe to be manufactured; after placing the "coil" in the mold, the end of a pre-heated borer, or mandrel, defining the internal shape of the pipe to be made, is introduced into the coil; then the axial pressures are applied to the coil by means of the borer, and a pressure sleeve introduced into the mold on the end opposite the borer entry while maintaining the temperature of the borer and the mold at the preheat temperature; and finally, after the mold is locked, polymerization of the resin is carried out.

BRIEF DESCRIPTION OF THE DRAWINGS

FIG. 1 illustrates, in perspective, a coil of resin-impregnated fabric.

FIG. 2 illustrates the coil deployed in spiral turns in the course of the molding.

DETAILED SUMMARY OF THE INVENTION

Figure 3:
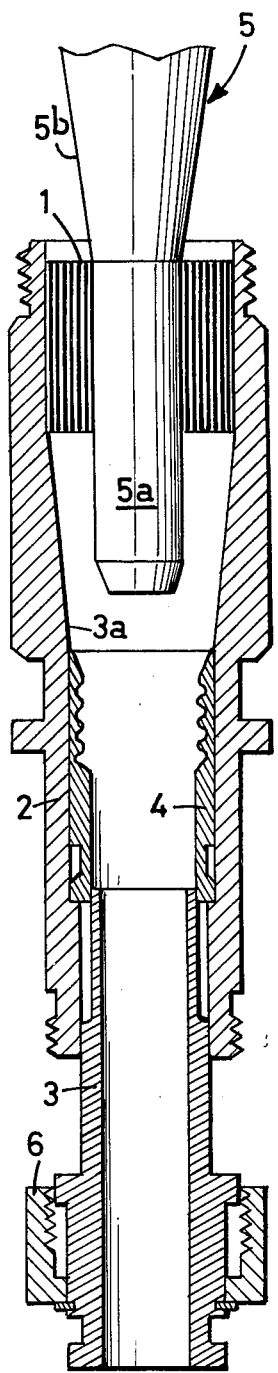
FIG. 3 illustrates, in longitudinal section, a shaping mold and a borer, according to the invention, engaged with the coil of FIG. 1.

It is advantageous to apply the axial thrusts to the coil successively to insure the compression and the molding of the material, the thrust on the sleeve being applied after the thrust on the borer. The thrust on the borer is preferably stronger than the thrust on the sleeve, and sufficient to oppose the latter.

It is preferable to preheat the coil to a temperature close to the softening point of the impregnation resin; the borer and the mold can be preheated to a temperature close to the melting point of the impregnation resin. Preheating of the coil, mold and borer facilitates sliding the coil into the mold and the borer into the coil.

Preferably, the coil is introduced into the upper end of a mold disposed vertically.

When a conical pipe is to be fabricated, it is preferred that the inner surface of the mold and the outer surface of the borer have conjugated conical parts so that the coil, under the thrust of the borer, will be formed into a cone. The turns of the coil shift in relation to each other to assume a spiral configuration. It is possible to arrange a mold with an insert so that the coil, as it shifts to assume a spiral configuration, will line the insert placed in the mold. The insert and the conical coil form one piece. This method makes it possible to fabricate conical pipe.

The method of the present invention has economic advantages due to its short manufacturing time and exact quantity of material used and mechanical advantages due to the increased strength of the structures produced. The method is applicable to the manufacture of pipe in a wide range of sizes and shapes; in particular, cylindrical or conical. The method can use a wide variety of fabrics such as fabrics of glass fiber, carbon, graphite or polyamide, impregnated with polyester, epoxy, polyimide, silicone resins, and the like.

The description which follows, in reference to the drawings by way of non-limiting examples, will make possible a clear understanding of the present invention and its application in practice.

An example of application of the method according to the present invention will be described in relation to fabrication of a missile ejection nozzle.

The method comprises impregnating, in a known fashion, a large sheet of fabric, for example a silica fabric, with a thermosetting resin such as, for example, a phenolic resin dissolved in a solvent. The impregnated sheet is then dried by heating and evaporation in a vacuum. Strips are cut from the dried impregnated sheet. The strips are wound to form a hollow cylinder 1, without mandrel. The hollow cylinder hereinafter designated as a "coil" is shown in FIG. 1. The dimensions of the coil are, of course, related to the size of the propulsive ejection nozzle for powder gases or ergols of a missile and/or a tactical or strategic round. A web with a length of approximately 4 m, and a width of about 80 mm, can be used to fabricate a nozzle with a length of about 140 mm and a diameter at the divergent end of about 60 mm.

The coil 1 of resin-impregnated fabric, after drying, is preheated to a temperature close to the softening point of the impregnation resin which, for a phenolic resin, is in the range of 70° to 80° C. The preheating to a temperature in the range of the softening point of the resin confers a suppleness on the fabric, and plasticity on the coil. The supple coil is then engaged with the bore of a shaping mold 2 of revolution at one of its ends (FIG. 3). The mold is provided at its other end with a presser sleeve 3 and can have in its interior, an insert 4 of metal or other material which can serve as a means of introduction of force such as a connecting, attachment, control or exterior hooping element, with no limitation, on the finished nozzle.

Figure 4:
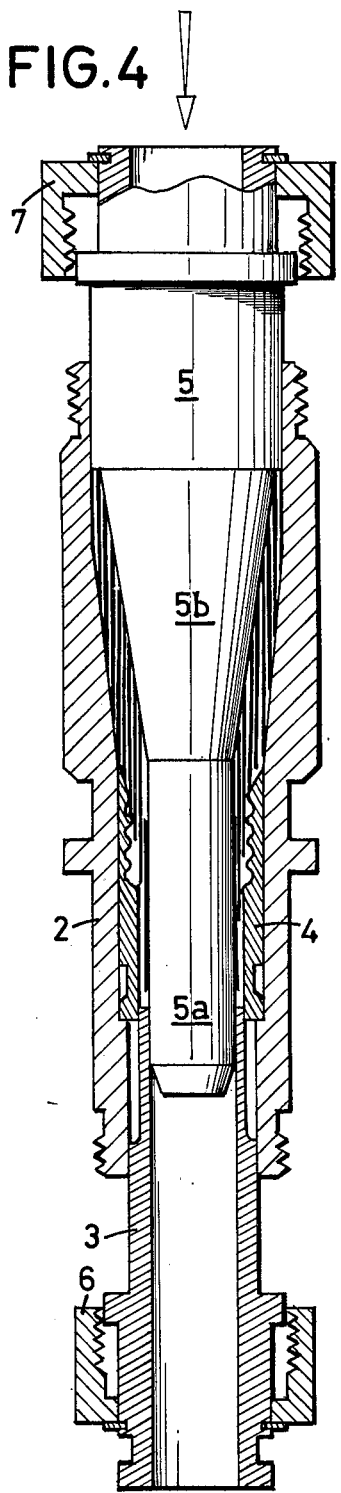
FIG. 4 illustrates, in longitudinal section, the phase corresponding to FIG. 2.

The mold, in the vertical position, is then subjected to the action of a machine for molding. The cylindrical part $5a$ of a conical borer 5, which conforms to the interior shape of the nozzle, is introduced into the central hole 9 of the coil 1. The borer 5, as well as the shaping mold 2, are preheated to a temperature close to the melting point of the resin impregnating the fabric which, for a phenolic resin used in the example, is in the range of 120° C. The soft molten resin, at this temperature, and the weight of the borer, facilitate the relative movement of the turns of the cylindrical preformed coil 1, to assume substantially the geometric shape of the desired pipe (FIG. 4). The pipe is defined by conical parts $3a$ and $5b$ of mold 3 and of borer 5, the turns of the coil disposing themselves under the annular insert 4 previously placed in the mold 2. As the movement and sliding occur, the temperature of the mold and the borer premits the fabric of the coil to adhere firmly to the walls of the mold and of the borer, the adhesiveness being accentuated and completed in the course of the operation that follows.

Figure 5:
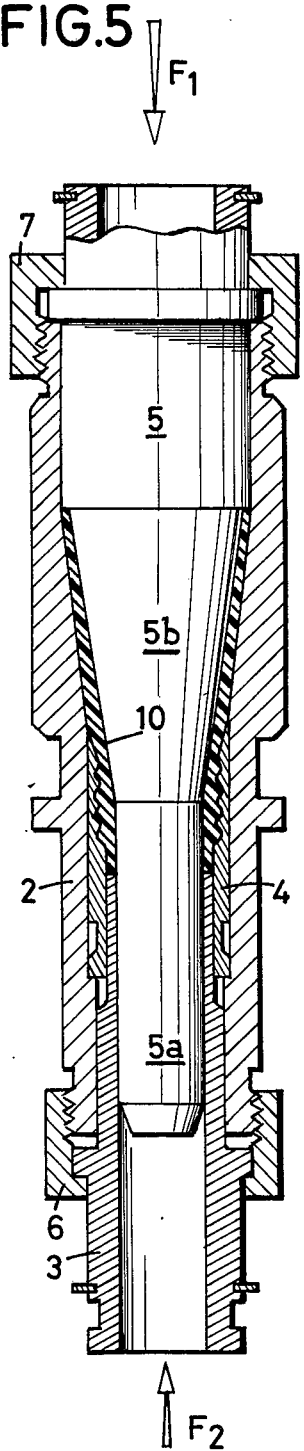
FIG. 5 illustrates the phase of molding the pipe with application of thrust on either end of the shaping mold.

Jacks, not shown, disposed at both ends of the shaping mold assembly act respectively on the borer 5 and the sleeve 3 (FIG. 5), and successively exert thrusts $F_1$ and $F_2$, in such a way that thrust $F_1$ will be sufficient to oppose thrust $F_2$. The thrust is required to precisely position the preform in the mold. Thrust $F_2$ causes the compression of the material and the molding. Thrust $F_1$ is greater than thrust $F_2$, and the latter is applied after thrust $F_1$. During the compression operation, when a phenolic resin is used, the pre-heat temperature of the mold and the borer is maintained at about 120° C. in order to prevent premature polymerization of the material. At the end of compression, the shaping mold assembly is locked with the aid of nuts 6 and 7 borne respectively by sleeve 3 and borer 5, which are screwed onto threaded parts formed on the outer end wall of mold 2.

The locked shaper mold assembly is then removed from the molding machine in order to polymerize molded pipe 10 which it contains. The polymerization procedure is appropriate to the resin used. When a phenolic resin is used, the mold assembly is generally heated in an oven at a temperature of 175° C., for approximately 2 to 3 hours. When a silicone resin is used, the polymerization is carried out at a temperature in the range of 80° C. for 8 hours. Certain resins such as epoxy and polyester resins, for example, may not require heating in an oven since polymerization at ambient temperature can prove sufficient.

After polymerization, the cylindro-conical pipe thus made is removed from the mold, and requires no other machining operation. The pipe, with insert 4 with which it forms one piece, can be used as a nozzle on a missile.

What is claimed is:

1. A method for making a tubular hollow body from fabric impregnated with a thermosetting resin, comprising:

forming a coil of dry, thermosetting resin impregnated fabric, inserting the coil into a hollow mold having two open ends, inserting a preheated mandrel into the coil through a first of said open ends, said mandrel having a conical portion and a cylindrical portion, causing turns of the coil to shift axially and form a conical shape larger than said coil as initially inserted in said mold, inserting a presser sleeve into the mold through the second open end, said sleeve surrounding said cylindrical portion and cooperating with said mandrel and said hollow mold to exert pressure on said coil and to shape said coil while maintaining the temperature of the coil above the softening point of the resin but below a temperature at which significant further polymerization will occur, and then further polymerizing said resin.

2. A method according to claim 1 wherein the axial thrusts are applied successively, the thrust on the sleeve being applied after the thrust on the mandrel.

3. A method according to claim 1 or 2, wherein the thrust on the mandrel is stronger than the thrust on the sleeve and is sufficient to oppose the latter.

4. A method according to claim 1 or 2, wherein the coil is preheated to a temperature close to the softening point of the impregnation resin.

5. A method according to claim 1 or 2, wherein the mandrel and the mold are preheated to a temperature close to the melting point of the resin.

6. A method according to claim 1 or 2, wherein the coil is introduced at the upper end of the mold disposed vertically.

7. A method according to claim 1 or 2, wherein the inner surface of the mold and the outer surface of the mandrel have conjugated conical parts, and the coil, under the thrust of the mandrel, forms a cone, the turns of the coil shifting relative to each other to assume a spiral configuration.

8. A method according to claim 7, wherein the coil, in the form of a spiral, lines an insert prepositioned in the mold, with which said insert the conical coil forms one piece.

9. A pipe produced by the method of claim 1 or 2 or 7.

10. A nozzle obtained by the method according to claim 7 or 8.

* * * * *

UNITED STATES PATENT AND TRADEMARK OFFICE
CERTIFICATE OF CORRECTION

PATENT NO. : 4,289,168

DATED : September 15, 1981

INVENTOR(S) : Guy B. E. Lecourt and Claude L. L. Portalier

It is certified that error appears in the above—identified patent and that said Letters Patent is hereby corrected as shown below:

On the Title page Item [73] Assignee should read:

--Societe Nationale Industrielle Aerospatiale--.

In line Attorney, Agent, or Firm change, "Burgess, Ryan and Wayne" to -- Offner and Kuhn--.

Signed and Sealed this

Fifteenth Day of June 1982

[SEAL]

Attest:

GERALD J. MOSSINGHOFF

Attesting Officer

Commissioner of Patents and Trademarks